United States Patent
Vakil et al.

(10) Patent No.: US 8,645,282 B2
(45) Date of Patent: Feb. 4, 2014

(54) METHOD AND APPARATUS TO CONDUCT A COMMERCIAL TRANSACTION OVER WIRELESS NETWORKS

(75) Inventors: Faramak Vakil, Bedminster, NJ (US); Vijay K. Varma, Holmdel, NJ (US); Raquel Morera Sempere, Morristown, NJ (US); Giovanni Di Crescenzo, Chatham, NJ (US)

(73) Assignee: TTI Inventions C LLC, Wilmington, DE (US)

( * ) Notice: Subject to any disclaimer, the term of this patent is extended or adjusted under 35 U.S.C. 154(b) by 1417 days.

(21) Appl. No.: 11/434,633

(22) Filed: May 16, 2006

(65) Prior Publication Data

US 2006/0265339 A1 Nov. 23, 2006

Related U.S. Application Data

(60) Provisional application No. 60/681,603, filed on May 17, 2005.

(51) Int. Cl.
  *G06Q 10/00* (2012.01)
  *G06Q 20/00* (2012.01)

(52) U.S. Cl.
  USPC ........................................................ 705/76

(58) Field of Classification Search
  USPC .............. 705/76, 16, 21, 59, 71; 380/44, 262, 380/278, 279
  See application file for complete search history.

(56) References Cited

U.S. PATENT DOCUMENTS

| | | | |
|---|---|---|---|
| 4,302,810 A | * | 11/1981 | Bouricius et al. ............... 705/75 |
| 5,961,593 A | * | 10/1999 | Gabber et al. ................. 709/219 |
| RE38,070 E | * | 4/2003 | Spies et al. ..................... 380/277 |
| 6,560,581 B1 | | 5/2003 | Fox et al. |
| 7,395,426 B2 | | 7/2008 | Lee et al. |
| 2003/0084003 A1 | * | 5/2003 | Pinkas et al. .................... 705/71 |

(Continued)

FOREIGN PATENT DOCUMENTS

| | | |
|---|---|---|
| JP | 56-123589 A | 9/1981 |
| JP | 2000-349748 | 12/2000 |

(Continued)

OTHER PUBLICATIONS

International Search Report relating to Patent Application No. PCT/US06/18836.

(Continued)

*Primary Examiner* — Dante Ravetti
(74) *Attorney, Agent, or Firm* — Fitch, Even, Tabin & Flannery LLP

(57) ABSTRACT

A Secure Virtual Point of Service (SVPOS) that coordinates the authentication, authorization, and identity, settlement, arbitration and non-repudiation for an electronic commercial transaction. For each commercial transaction, both the buyer and merchant authenticate itself to the SVPOS and create two unique transaction encryption keys, one for the buyer and one for the merchant. The merchant uses both encryption keys to encrypt a package that include at least product identification. The merchant and buyer calculate a hash of the package and transmit the calculated hash to the SVPOS for comparison to prevent repudiation. If the calculated hash is identical the buyer receives the merchants encryption key and decrypts the package. Payment is released by the SVPOS if the buyer is satisfied with the package via a Parlay system. If the buyer is not satisfied, said SVPOS performs arbitration between the buyer and merchant to determine if the package is correct.

22 Claims, 9 Drawing Sheets

(56) References Cited

U.S. PATENT DOCUMENTS

| | | | |
|---|---|---|---|
| 2003/0200431 A1* | 10/2003 | Stirbu | 713/168 |
| 2005/0102230 A1 | 5/2005 | Haidar | |
| 2005/0169479 A1* | 8/2005 | Ekstrom | 380/277 |
| 2005/0251488 A1* | 11/2005 | Saunders et al. | 705/59 |
| 2005/0287990 A1* | 12/2005 | Mononen et al. | 455/411 |
| 2006/0133329 A1* | 6/2006 | Lewis et al. | 370/338 |
| 2006/0167819 A1* | 7/2006 | Bhambri et al. | 705/64 |
| 2006/0181397 A1* | 8/2006 | Limbachiya | 340/10.51 |
| 2006/0195367 A1* | 8/2006 | Allfred et al. | 705/26 |
| 2006/0205388 A1* | 9/2006 | Semple et al. | 455/411 |
| 2008/0195551 A1* | 8/2008 | McIsaac et al. | 705/75 |

FOREIGN PATENT DOCUMENTS

| | | |
|---|---|---|
| JP | 2002-006973 | 1/2002 |
| JP | 2002132735 | 5/2002 |
| JP | 2002-288054 | 10/2002 |
| JP | 2003-006363 | 1/2003 |
| JP | 2003-141382 | 5/2003 |
| JP | 2003-515822 A | 5/2003 |
| JP | 2003323515 | 11/2003 |
| JP | 2004-295507 | 10/2004 |
| JP | 2004-334842 | 11/2004 |
| WO | 2001-039062 A1 | 5/2001 |
| WO | 2003-107712 A1 | 12/2003 |

OTHER PUBLICATIONS

Official Notice of Rejection from related Japanese Application No. 2008-512425, dated Mar. 18, 2011; 12 pages including English translation.

Article 94(3) EPC from related European Patent Application No. 06759895.3 dated May 8, 2013; 5 pages.

Extended European Search Report from related European Patent Application No. 06759895.3; dated Dec. 20, 2011; 7 pages.

* cited by examiner

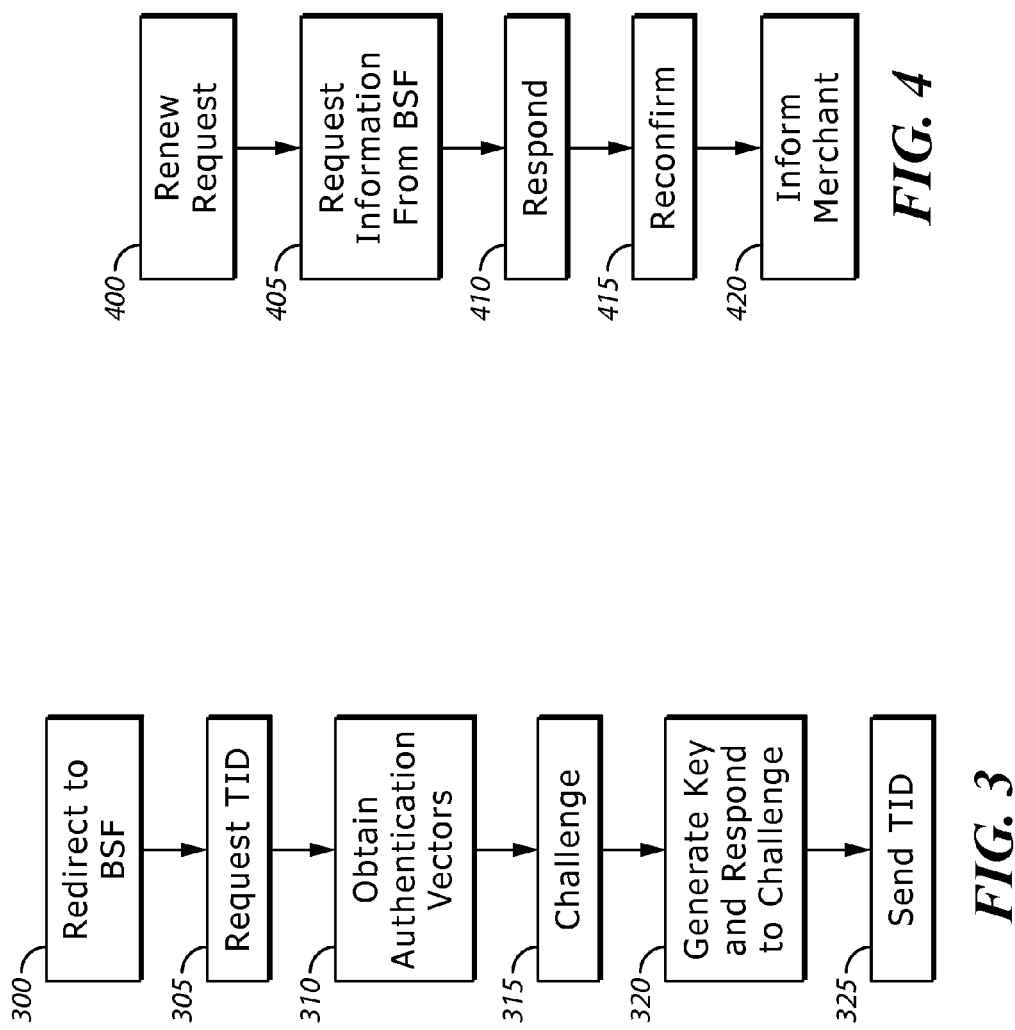

US 8,645,282 B2

METHOD AND APPARATUS TO CONDUCT A COMMERCIAL TRANSACTION OVER WIRELESS NETWORKS

CROSS REFERENCE TO RELATED APPLICATIONS

This application relates to and claims priority to U.S. Provisional Application 60/681,603 filed on May 17, 2005 in the name of Faramak Vakil et al, entitled "Secure Virtual Point of Service for 3G Wireless Networks."

FIELD OF THE INVENTION

The present invention is related to wireless networks that enable peer-to-peer transactions between any two subscribers through an operator. The invention more particularly relates to a secure virtual point for service for a 3G wireless network that allows for payment of a transaction to be made using a mobile wireless device as an electronic wallet.

BACKGROUND OF THE INVENTION

Everyone has a plethora of credit cards, and payment by credit card has practically become the prevalent way of conducting daily transactions, whether online or in person, between buyers and sellers. On the one hand, carrying a wallet full of credit cards is inconvenient and poses risks of loss, theft, and fraud. On the other hand, online transactions, such as banking and shopping, are becoming routine or commonplace in today's society. A purchase online requires the purchaser to provide personal credentials and payment information. This practice leads to many concerns such as security, privacy, and anonymity due to personal information and payment information being transmitted over a network. For example, a merchant can share personal credentials such as addresses and emails with other business partners. Additionally, a merchant can also transmit unwanted advertisement information directly to the purchaser.

Payment also is a major issue in online transactions. One type of payment is using a credit card. A typical credit card purchase requires the purchaser to input the personal identification information in addition to a credit card number and purchase amount. The merchant receives this information and forwards the information to the merchant's bank. The merchant's bank attempts to obtain an authorization from the purchaser's bank. The purchaser's bank then authorizes the purchase for the amount and transmits an authorization code to the merchant's bank, which relays the authorization to the merchant. Upon receipt of the authorization; the merchant will approve the transaction. This is a direct payment to the merchant.

A second type of payment is using a cellular or mobile telephone as an electronic payment means. For example, NTT has developed a system that facilitates payment of certain goods by using a cellular or mobile telephone. This system is called the I-mode phone. The I-mode phone is a phone that allows the user access to the Internet and the Web. The phone sends emails or text messages, and provides access to a website. There are two types of websites within the I-mode system, official and unofficial sites. Official sites are the sites that have been approved by DoCoMo. These sites have a preexisting alliance or relationships with DoCoMo. Purchases from any "official sites" are automatically charged to the subscriber's monthly phone bill. Unofficial sites do not have a preexisting alliance or relationship with DoCoMo and purchases from these sites cannot be billed to the subscribers monthly phone bill. These sites have not access to DoCoNo's billing system. Payment would have to be made using credit card or other forms of payment.

Another system that allows for payment using a cellular or mobile telephone is Vodafone "m-pay" or "s-shopping". Payments are charged to a monthly bill or deducted from a Pay As You Talk credit. Payment is authorized by a user name and password for Internet purchases and a PIN number for purchases. The m-pay service works by integrating a point of sale client into the merchant's e-commerce platform. This point of sale communicates with the Vodafone m-pay bill server to authorize payments and to initiate refunds for transactions.

The point of sale manages payment, authorization, and refund management. The Vodafone m-pay bill server manages consumer authentication, payment processing and response processing.

Both the Vodafone m-pay and the DoCoMo payment systems have limited applications. A buyer cannot use the mobile phone to pay for a transaction with a merchant that does not have an explicit pre-established business relationship with the buyer's specific phone operator. The systems will only work with merchants and content providers with explicit affiliations, i.e., official websites. Additionally, these systems have privacy and security concerns. Vodafone m-pay and the DoCoMo use an explicit public key management infrastructure. Furthermore, Vodafone m-pay system has a limit in the purchase amount.

However, there is a need for a system to enable a 3G-network subscriber to use a mobile device for daily transactions and payments without the limitations of the prior art. Specifically, there is a need for a system that ensures the privacy and anonymity of the 3G subscriber, and to protect that operator, merchant and subscriber against repudiation.

BRIEF SUMMARY OF THE INVENTION

Provided is a unique network application function, namely, a secure virtual point of service (SVPOS) that coordinates the authentication, authorization, and identity management and charging enablers of a 3G-network and transforms a subscriber's mobile device into a credit/debt payment device. The SVPOS also includes a non-repudiation enabler. The SVPOS system allows subscribers to conduct transactions with merchants. The SVPOS can be managed by 3G operator.

Specially, the SVPOS manages and controls settlement for a commercial transaction. The SVPOS redirects both a buyer and a merchant to a Bootstrapping Server function (BSF) for authentication. After authentication, the SVPOS obtains authorization for payment from the buyer and reconfirms it when the merchant is ready to sell the product or service to the buyer using the SVPOS as the means of payment. The SVPOS receives a calculated merchant hash of at least a portion of a package and a calculated buyer hash of at least an identical portion of the package to prevent repudiation. The package includes at least product identification, and a receipt of the transaction. The SVPOS compares both calculated hashes and transmits a merchant encryption key to the buyer based upon the comparison. The SVPOS causes payment to be released and transferred to the merchant based upon the buyer's determination of satisfaction for the package.

The SVPOS causes payment information for the commercial transaction to be stored. The payment information includes the cost of the commercial transaction and a receipt thereof.

If the buyer is not satisfied with the package, the SVPOS performs arbitration for the commercial transaction. The arbitration process determines whether the merchant included a correct product and product identification in the package. If the package did not include the correct product, the merchant is given an opportunity to remedy the situation.

The SPVOS is part of a settlement system for commercial transactions using a device connected to a communication network. The settlement system comprises a home subscriber server (HSS) for storing authentication vectors for a buyer and a merchant. The HSS works in combination with a bootstrapping server (BSF) to authenticate both the buyer and the merchant. The BSF obtains the authentication vectors of the buyer and the merchant from the HSS and uses this information to challenge the buyer and the merchant on order to authenticate the identity of the buyer and merchant based on their responses to the challenge from the BSF. The settlement system further comprises a PARLEY server for transferring payment from a buyer account to a merchant account and maintaining a record of the commercial transaction. A SVPOS manages the operation of the settlement system by redirecting the buyer and the merchant to the BSF for authentication, obtaining authorization for payment of the commercial transaction using the buyer's mobile device as a mobile wallet, after authentication, and transmitting a buyer encryption key to the merchant. The SVPOS includes a non-repudiation enabler, which compares a buyer hash value of at least a portion of a package with a merchant hash value of at least an identical portion of the package. The SVPOS transmits a merchant encryption key to the buyer if the buyer hash and merchant hash values are identical. The SVPOS releases payment to the merchant using the parley server if the buyer does not return the package to the SVPOS.

The settlement system further includes an authentication proxy, which acts as an intermediary between the buyer and merchant and the settlement system to provide anonymity for the buyer.

Also provided is an electronic payment method. The method comprises the steps of initiating a request from a buyer for payment for a product or service to a merchant. The request is initiated using a mobile electronic device. Both a buyer encryption key and a merchant encryption key are then determined. An encrypted package is generated. The encrypted package includes identification information regarding the product or service. The package is encrypted using both the buyer and merchant encryption keys. Both a merchant hash of at least a portion of the package and a buyer hash of at least an identical portion of the package are calculated. After both the merchant hash and buyer hash are calculated, they are compared. The merchant encryption key is transmitted to the buyer based upon the comparison. The package is then decrypted using the merchant encryption key. The buyer determines if the package is correct and payment for the product or service is released based upon this determination.

The mobile electronic device can be a mobile telephone. Alternatively, the mobile electronic device can be a portable computer.

The electronic payment method further comprises the step of authenticating the buyer which is using the mobile electronic device and a merchant which is selling the product or service. The authentication process for the buyer and merchant is similar. For the buyer, the authentication process includes requesting a first transaction identification from the bootstrapping server, the bootstrapping server's obtaining authentication vector for the buyer from a home subscriber server (HSS), issuing a challenge to the buyer, responding to the challenge, the response includes the buyer encryption key and transmitting the first transaction identification to the buyer and the SVPOS. Similarly for the merchant, the authentication process includes, requesting a second transaction identification from bootstrapping server, the bootstrapping server's obtaining authentication vectors for the merchant from the home subscriber server (HSS), issuing a challenge to the merchant, responding to the challenge, the response includes the merchant encryption key and transmitting the second transaction identification to the merchant and SVPOS. The first and second transaction identifications are different.

The electronic payment method further includes the steps of authorizing payment via the SVPOS and transmitting the buyer encryption key to the merchant upon receipt of the authorization.

Both the buyer and merchant encryption keys are generated based upon unique identification information in a SIM Card in the mobile device, and a SIM card located at the merchant. The buyer and merchant encryption keys are different for each transaction.

The encrypted package can include the product or service, product-ID and a receipt. If the product is not correct, the buyer transmits the package to the SVPOS for arbitration. Arbitration includes determining if a correct product-ID was transmitted, determining if a correct product was transmitted, and comparing the sent product-ID with the sent product. The correct product is determined based upon a comparison of product-IDs stored in a database with the sent product-ID. If the product is determined to be correct, the buyer transmits the receipt to the SVPOS and payment is released.

The electronic payment method further includes sending the package to the buyer, decrypting the package using only the buyer encryption key, reviewing the identification information regarding the product or service included in the package, determining if the identification information matches the product or service requested and calculating the buyer hash based upon the determination. The hash function may be either a keyed hash or a hash function without key. If it is a keyed hash, its key is obtained through a public key infrastructure. When the hash is a keyed hash, the package also contains the key used by the merchant for hashing.

Also disclosed is a method of purchasing a product or service. A request for a purchase and payment of the product or service is initiated to a merchant. The request is initiated using a mobile electronic device. A buyer encryption key is then determined. The buyer then receives a package from the merchant. The package is encrypted using at least the buyer encryption key. The package includes at least identification information regarding said product or service. A hash of at least a portion of the package is calculated, and sent to SVPOS in order to receive the merchant's encryption key from the SVPOS. The package is decrypted using a merchant encryption key and the buyer determines if the package is correct. Payment for the product or service is released based upon the determination.

The merchant encryption key is received only if the calculated buyer hash is correct. The calculated buyer hash is correct if the calculated buyer hash matches a calculated merchant hash. The merchant calculates the merchant hash. The method of purchasing a product or service further comprises the step of authenticating the buyer which is using the mobile electronic device and a merchant which is selling the product or service.

A method of selling a product or service is also disclosed. The merchant receives a request for a purchase and payment of the product or service from a buyer. The request is made using a mobile electronic device. The buyer is directed to a secure virtual point of service (SVPOS) for authentication and payment where a buyer key is also generated. A merchant is authenticated similarly, and a merchant encryption key is then determined. An encrypted package is then generated. The encrypted package includes identification information regarding the product or service. The encrypted package is encrypted using both the merchant encryption key and a buyer encryption key. The encrypted package is transmitted to the buyer. A merchant hash of at least a portion of the encrypted package is calculated and transmitted to the SVPOS. Both the merchant hash and the buyer hash are compared. Based upon the comparison, the merchant encryption key is transmitted to the buyer. The settlement of the purchase and payment is made based upon a determination of satisfaction.

The encrypted package can include the product or service, product-ID and a receipt. If the encrypted package includes the product, the determination of satisfaction includes determining if the product is correct. The buyer performs this determination. If the product is not correct, the step of settling the purchase and payment includes arbitration. If the product is correct, the step of settling the purchase and payment includes the sub-steps of receiving the receipt by said SVPOS and receiving payment from the buyer via the SVPOS.

The SVPOS only transmits the buyer encryption key from the SVPOS to the merchant after a successful authentication. The merchant encryption key is transmitted to the buyer only if the calculated merchant hash and said calculated buyer hash are found to be identical.

BRIEF DESCRIPTION OF THE DRAWINGS

FIG. 3 illustrates a flow chart for the steps of authenticating either a UE or a merchant in accordance with an embodiment of the invention;

FIG. 4 illustrates a flow chart for the steps of authorizing payment using the UE according to an embodiment of the invention;

DETAILED DESCRIPTION OF THE INVENTION

Figure 1:
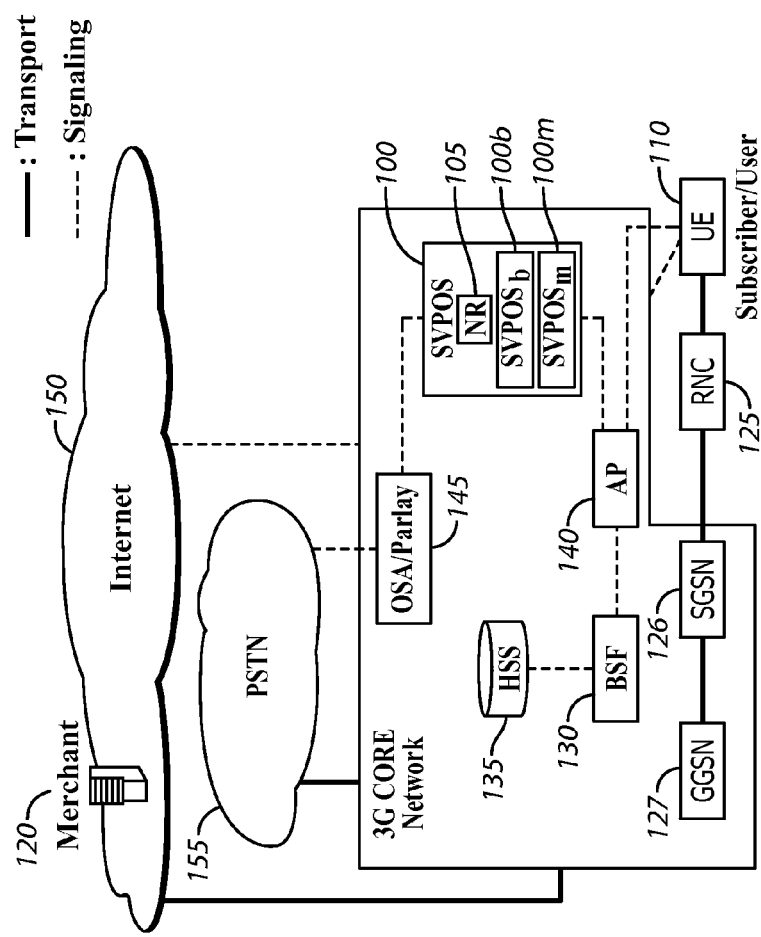
FIG. 1 illustrates a 3G wireless network including a subscriber, a merchant and an SVPOS in accordance with an embodiment of the invention.

FIG. 1 illustrates a secure virtual point of service (SVPOS) 100 with several 3G network components in accordance with an embodiment of the invention. The SVPOS 100 is a unique network application function that coordinates security, authentication, authorization and payment functions of a 3G wireless network to enable/facilitate purchases between a 3G buyer and a 3G merchant. The 3G buyer is labeled as user equipment or device (UE) 110 in FIG. 1. The UE or buyer 110 can communicate with an Internet 150 using the Radio network controller (RNC) 125 as an intermediary. The SVPOS 100 transforms a mobile device into an electronic wallet. The mobile device can be any type of mobile device such as a cellular telephone, PDA, or laptop. The only limitation on the type of device is that it is capable with 3G GAA. Similarly, the merchant 120 can be any type of merchant, however, the merchant 120 must have a server that is 3G GAA enabled. FIG. 1 illustrates the merchant 120 as being located on the Internet 150, however, the merchant 120 can be a physical stored with Internet access and not necessarily only have a website. The SVPOS 100 takes advantage of the Generic Authentication Architecture (GAA) of the 3GPP, and combines this with a novel non-repudiation mechanism to transfer the mobile device into the mobile wallet. The SVPOS 100 allows subscribers or buyers e.g., UE 110 to conduct transactions with merchants 120 while informing them that a 3G operator will pay for the goods. The system uses a GAA to authenticate subscribers 110 and merchants 120, and distribute two encryptions keys, one for the buyer 110 and the other for the merchant 120.

As illustrated in FIG. 1, the solid lines represent a transport. The transport refers to exchange of subscribers/users' data (e.g., content of the message or conversation content during a call) across the network. The dashed lines represent control signaling. Signaling refers to the exchange of network control data for supporting services, e.g. exchange of data between network entities to set up a telephone call.

The bootstrapping function (BSF) 130, HSS 135, and authentication Proxy (AP) 140 belong to the GAA that authenticates subscribers and merchants, and Parlay 145 provides means of providing charging records to the operator's accounting and billing entity. The NR 105 represents the non-repudiation functional entity. In the illustrated embodiment, the NR 105 is depicted as being integrated with the SVPOS 100, however, the NR 105 can be kept separate. Additionally, FIG. 1 depicts the AP 140 as being an intermediary between the UE 110 and the SVPOS 100. The AP 140 is used to ensure the anonymity of the subscribers or UE 110. The AP 140, sitting between the subscriber's UE 110 and SVPOS 100; takes the role of an application function (NAF) for the UE 110. The UE 110 establishes a TLS tunnel to the AP 140 sending all his packets to it for forwarding to the SVPOS 100. The strength of AP 140 is that it can serve as a privacy policy enforcement point for the 3G operator, where it can enforce different privacy/anonymity policies for different services. The gateway GPRS support node (GGSN) 127 acts as an interface between the GPRS network, e.g., radio network and the external packet data network, i.e., the IP network). It converts the packets coming from the serving GPRS Support Node (SGSN) 126 into the appropriate packet data protocol (PDP) format (e.g. IP or X.25) and sends them out on the corresponding packet data network. The PSTN 155 (public switched telephone network) supports subscribers' (UEs') 110 telephone calls. The SVPOS 100 uses the packet switched domain of IMS.

The SVPOS 100 can be one entity, representing both the buyer and merchant. Alternatively, there can be two or more SVPOSs 100, one representing the buyers SVPOS and the other representing the merchants SVPOS. The buyer's SVPOS (denoted as $SVPOS_b$ 100b hereafter) and merchant's SVPOS (denoted as $SVPOS_m$ 100m, hereafter) can be the same or different. If they are the same, only one SVPOS will be used. The $SVPOS_b$ 100b and $SVPOS_m$ 100m communicate through a secure link, e.g., through an IPSEC tunnel or using HTTP over SSL. For the purposes of the description, $SVPOS_b$ is referenced when the function described is performed by only the buyer's SVPOS 100; $SVPOS_m$ is referenced when the function described is performed by only the merchants SVPOS 100; and SVPOS 100 is referenced when the function described can be performed by either or both the SVPOS of the buyer and the merchant.

The functionality of each element will be described with reference to FIG. 2, which illustrates a flow chart of the operation of an electronic purchase according to the invention.

Figure 2:
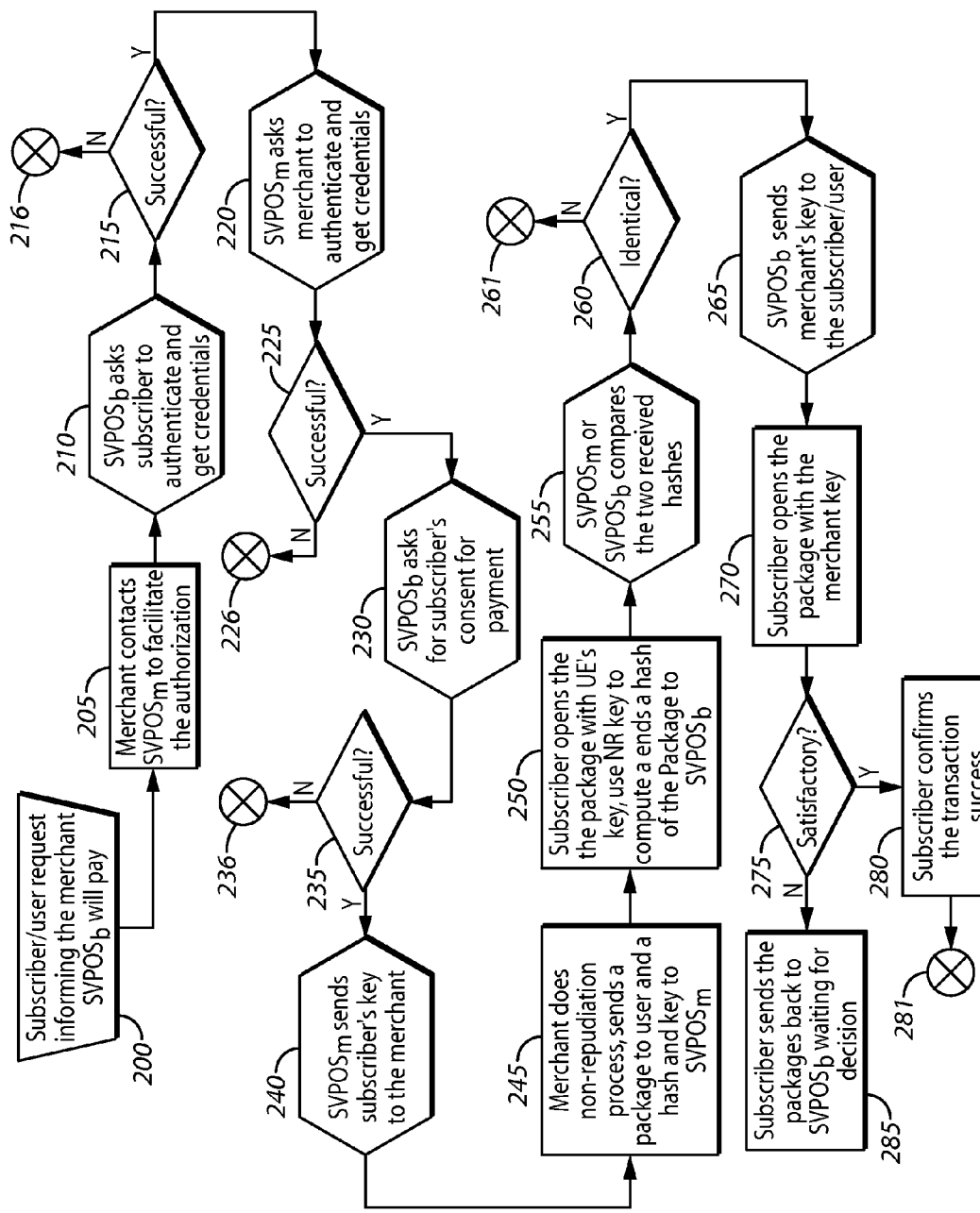
FIG. 2 illustrates a flow chart for the SVPOS operation.

As depicted in FIG. 2, the UE 110 requests a good from a merchant 120, indicating the payment will be made using it SVPOS$_b$ 100b at step 200. Upon receipt of this request, the merchant 120 contacts its own SVPOS$_m$ 100m to facilitate the purchase and payment and request authorization of the payment, at step 205. The SVPOS$_m$ 100m will contact the SVPOS$_b$ 100b to obtain authentication and authorization for the transaction. The SVPOS$_b$ 100b will request the UE 110 to authenticate itself and obtain the necessary credentials, e.g., a transaction identifier (T-ID) and an encryption key for the transaction, at step 210.

SVPOS 100 utilizes the 3GPP GAA to authenticate subscribers and keep their identities anonymous upon request. There are several advantages of using the GAA for authenticating subscribers are that it is efficient, it is a 3GPP standard and can support subscriber anonymity through the use of an AP.

The SVPOS 100 uses a Bootstrapping Server Function (BSF) 130 for the authentication. This BSF 130 has an interface with the Home Subscriber Server (HSS) 135. The HSS 135 is the repository of all subscriber information. The UE 110 runs Authentication Key Agreement (AKA) with the HSS 135 via the BSF 130. A session key is derived in BSF 130 and UE 110. A network application function (NAF) or SVPOS 100 can fetch this session key from the BSF 130 together with subscriber profile information. In this way the SVPOS 100 and the UE 110 share a secret key that can subsequently be used for application security, in particular to authenticate UE 110 and the SVPOS 100 at the start of the application session (possibly also for integrity and/or confidentiality protection).

FIG. 3 illustrates a flow chart for the authentication of the UE 110. At step 300, the SVPOS$_b$ 100b redirects the UE 110 to the BSF 130 for bootstrapping so that the UE 110 can obtain a transaction identifier from the BSF 130 and generate a session key using the Authentication Key Agreement (AKA) in its SIM card. At step 305, the UE 110 requests a transaction identifier (TID-UE) from the BSF 130. Prior to sending the TID-UE, the BSF 130 must authenticate the UE 110. At step 310, the BSF 130 obtains the UE's authentication vector from the HSS 135. The authentication vector is a quintet comprising, a random number (RAND), an authentication token (AUTN), a Cipher Key (CK), an Integrity Key (IK) and the expected response (XRES) among other things. It is the unique identification related to the mobile device stored in the HSS. The BSF 130 issues a challenge message containing only the RAND and AUTN to the UE 110 to authenticate itself, at step 315. The UE 110 uses the RAND and AUTN key with the standard mathematical functions of AKA residing on its SIM card to derive the XRES as well as a session key (Ks-UE) for the transaction, at step 320. The AKA key generation algorithm uses executables of five standard mathematical functions saved on the SIM card with AUTN, RAND to derive XRES as well as the Ks-UE The UE 110 then sends a response to the challenge containing the XRES though including the key to the BSF. If the response, i.e., XRES, is correct; the BSF 130 sends the TID-UE, at step 325. If not, the authentication fails. If the response is correct, the BSF 130 sends the TID-UE, at step 325. If not, the authentication fails. Upon receipt of the TID-UE from the BSF, the UE 110 will renew the request for the product from the merchant 120. The renewed request will include the TID-UE, and a temporary mobile subscriber identification (TMSI).

The SVPOS$_b$ 100b will determine whether the authentication was successful at step 215. If yes, then the SVPOS$_b$ 100b will contact the SVPOS$_m$ 100m to authenticate the merchant. If no, i.e., the buyer authentication was unsuccessful, the transaction is ended (step 216).

At step 220, the merchant's SVPOS$_m$ 100m will authenticate the merchant 110. The nature of the authentication process for the merchant 120 depends on the relationship of the merchant 120 with a 3G operator or the SVPOS 100. There are three types of relationship. First, the merchant is a partner provider of the 3G operator, meaning that it has an explicit business partnership with the operator. In the parlance of GAA, the merchant server in this scenario can essentially be viewed as an "operator controlled" network application function (NAF) that may require no further authentication. In this scenario, the merchant SVPOS does not need authenticate the merchant. Second, the merchant is a 3$^{rd}$ party provider, not a business partner, who utilizes OSA/PARLAY or similar mechanisms to authenticate himself to the operator. In this scenario, the merchant 120 may or may not be GAA-enabled. If it is not GAA-enabled, then it uses either the OSA/Parlay authentication and verification mechanism to authenticate itself to the SVPOS$_m$ 100m and generate the merchant key through the OSA/Parlay platform, or any other authentication mechanism that the merchant 120 and its operator have agreed upon. If the merchant is GAA-enabled, then the 2$^{nd}$ scenario will be the same as the 3$^{rd}$ one. Third, the merchant 120 is another 3G network SVPOS-enabled subscriber, meaning that the merchant application server is GAA-enabled and has subscribed to the SVPOS 100 service of the 3G operator. In this case it uses the GAA algorithm to authenticate itself and generate the merchant key.

Once again the SVPOS 100 (e.g., SVPOS$_m$ 100m) uses the GAA for authentication. For the second and third types of relationship, the authentication process is the same for the merchant 120. The authentication process assumes that the merchant 120 has SIM card capabilities or similar identification capabilities. After reception of the renewed request with appropriate parameters (i.e., TID-UE, UE-TMSI, etc.) from the UE 110, the merchant 120 sends a message containing TID-UE, UE, TMSI, Price, etc., to the SVPOS$_m$ 100 requesting for authorization of the transaction.

SVPOS$_m$ 100m sends a response to the merchant 120 directing the merchant 120 to the BSF 130 so the merchant 120 can obtain its own transaction identifier (TID-MER) and session key (Ks-MER). The authentication and key generating process is the same for the UE 110 (illustrated in FIG. 3) and thus will not be described in detail.

The SVPOS$_m$ 100m will determine whether the authentication was successful at step 225. If yes, then the SVPOS$_m$ 100m will contact the SVPOS$_b$ 100b to get the final consent of the UE 110, and re-authorize payment from the UE 110. If the authentication was unsuccessful, the transaction is ended (step 226).

FIG. 4 illustrates the step performed for re-authorization, i.e., the sub-steps for step 230.

At step 400, the merchant 120 renews the request for authorization for payment from the UE 110 via the SVPOS 100. The request is sent to SVPOS$_m$ 100m and contains TID-UE, TID-MER, Merchants server hostname, Price, etc. The SVPOS$_m$ 100m will forward the request to the SVPOS$_b$ 100b. The SVPOS$_b$ 100b will then send a request for both session keys Ks-UE and Ks-MER from the BSF 130, at step 405. The request will include the TIDs for UE 110 and merchant 120, UE-TMSI, price, etc. At step 410, the BSF 130 will respond to the request by sending the keys, i.e., Ks-UE and Ks-MER. Both the SVPOS$_b$ 100$b$ and SVPOS$_m$ 100$m$ will have access to the keys. The SVPOS$_b$ 100$b$ will request the UE 110 to reconfirm the transaction, at step 415. The request will include both TIDs, and the cost of the goods or service. The UE 110 will reconfirm the transaction with a message containing the TIDs. This message is sent to the SVPOS$_b$ 100$b$. The SVPOS$_b$ 100$b$ will forward the confirmation to the SVPOS$_m$ 100$m$. Upon reception of reconfirmation from the UE 110, the SVPOS$_m$ 100$m$ sends a response message to the merchant 120 containing the TIDs, Ks-UE, price, etc. informing the merchant 120 that SVPOS 100 accepts to pay for the transaction, at step 420.

If the authorization, at step 230 is successful, the UE's key, Ks-UE, is sent to the merchant 120, at step 240. SVPOS$_m$ 100$m$ sends the Ks-UE to the merchant 120. If the authorization fails, the transaction is terminated, at step 236.

Upon receipt of the confirmation, the merchant 120 begins to prepare a non-repudiation package that includes a summary or preview of the product. If the product is electronically deliverable by them the package can include the product, at step 245. This package prevents repudiation, which is a major concern in e-business. There are several reasons for non-repudiation. The merchant 120 may have made an unintentional mistake resulting in the subscriber receiving a wrong content. A malicious subscriber who received the correct content may claim receiving a wrong one to avoid paying for the transaction. Finally, a merchant 130 may send wrong content intentionally to get revenues from something the user does not want. As depicted in FIG. 1, the SVPOS 100 includes a NR section 105. The section prevents repudiation by including a examining hash functions and digital signatures.

The SVPOS 100 requires two distinct encryption keys per session/transaction. One key belongs to the subscriber and is denoted as Ks-UE, and the other belongs to the merchant and is denoted as Ks-MER.

In one embodiment, the merchant 120 creates a package include the goods or service where the goods or service can only be opened by both keys. This embodiment will be used if the product is electronically deliverable. The package delivered from the merchant 120 to the UE 110 is such that it prevents the subscriber from repudiating the transaction fraudulently, prevents merchant from perpetrating fraud against the user, protects merchant against content piracy ensures that the user provides an irrefutable receipt of delivery, and enables the 3G operator to investigate claims and counter claims.

The merchant 120 creates the package, the merchant 120 uses a concatenation of its session key (i.e., Ks-MER) and the UE's temporary mobile subscriber identifier, namely, (Ks-MER||UE-TMSI) to further encrypt the product. The intent of this key is to encrypt the product such that the UE 110 can not decrypt the product and view the product until SVPOS 100 (either the merchants or buyers) sends Ks-MER to the UE 110, and further it ensures that the product can only be displayed on the requesting UE 110 and prevents its copying onto other devices. SVPOS 100 sends Ks-MER to the UE only after UE 110 and SVPOS 100 are convinced of accurate delivery of the Package.

The merchant 120 prepares "the Package" containing the product, the receipt, and the product-ID; encrypted by Ks-MER||UE-TMSI, as well as the preview or summary of the product, Package=Ks-UE{Preview+Ks-MER||UE-TMSI {PRODUCT+receipt+PRODUCT-ID}, for delivery to the UE 110. The "Preview" is a summary of the product for the user to check whether the received product is what she/he asked for.

In another embodiment, the package will only include a summary or description of the product and receipt and product ID.

Additionally, at step 245 the merchant 120 generated a hash file. The SVPOS's non-repudiation scheme uses hash functions. Hashing a file/content creates a unique (non-reversible) hash output. Even a single bit change in the content will result in a different hash output.

In another embodiment, the hash file can be a keyed hash. Ks-Nr denotes the "non-repudiation key" for a standard hash function, hash$_{STD}$, that the UE 110 and the merchant 120 use to protect their transaction against non-repudiation. When the hash is signed by the merchant 110 using its Ks-Nr, it creates a unique signature that vouches for the content, and for the fact that it is signed by the merchant 120. The UE 110 (or the SVPOS$_b$ 100 on behalf of subscriber) will be able to verify that the hash was signed by the merchant 120 by decrypting it using the merchant's public key.

The merchant 120 create a hash (denoted as hash$_d$) of the product, the receipt, and the product-ID; encrypted by Ks-MER||UE-TMSI; i.e., hash$_d$=hash$_{STD}$ (Ks-MER||UE-TMSI {Product+receipt+Product-ID}), and sends it to the SVPOS$_m$ 100$m$. Alternatively, the product can be removed from the hash. The hash will only include the receipt and product ID.

At step 250, the UE 110 receives the package and decrypts the package with the Ks-UE. The UE 110 derives (Preview+Ks-MER||UE-TMSI {Product+receipt+Product-ID}), and computes hash$_d$. This computation is the same as performed by the merchant 120. The UE 110 sends its computed hash$_d$ to the SVPOS$_b$ 100$b$. Similarly, the product can be removed from the hash.

The SVPOS 100 decrypts the signed hash$_d$ received from the merchant 1220 using the merchant's public key and checks to see whether it matches with the hash$_d$ received from the UE 110, at step 255. Either or both the SVPOS's of the buyer or merchant can perform the decryption. If the value of hash$_d$ received from UE 110 and the one received from merchant 120 match, i.e., are identical (step 260), the SVPOS 100 sends Ks-MER to the UE 110 so that she/he can view the product, at step 265. A match indicates that the UE 110 has correctly received the package. If there is no match, the transaction is terminated, at step 261.

At step 270, the UE 110 will decrypt the package using Ks-MER, which was forwarded to the UE 110 by SVPOS 100 (e.g., SVPOS$_b$ 110$b$). In one embodiment, the package includes the product, receipt and product identification. The UE 110 will also use its own key Ks-UE to decrypt the package. At step 275, the UE 110 will determine if the product or service, or if the product or service is not included in the package, the summary (description of product) is satisfactory. The determination can include a comparison of the product identification, the received product and original product the UE 110 selected. If the product or description of the product is satisfactory and correct, the UE 110 will confirm the transaction at step 280. Specifically, the UE 110 will send the receipt to the SVPOS$_b$ 100$b$. When the SVPOS$_b$ 100$b$ receives the receipt, the SVPOS 100 (both the buyer's and merchant's if different) will create a session data record containing the time, buyer and seller names, the receipt of the transaction, and buyers final approval, among other thing and send it to the accounting entity of the buyer's operator to pay the merchant (or its operator, as appropriate) and charge it to the buyer's monthly bill.

On the other hand, if the UE 110 is not happy or satisfied with the product or description, the UE 110 will return the package, including the product, (if received) product identification and receipt, to the SVPOS$_b$ 100b, at step 285.

If the package included the purchased product, the SVPOS$_b$ 100b will investigate the reason why the package was returned. There are three general scenarios for a returned package. The first scenario is that the merchant 120 mistakenly sent the wrong product and wrong preview or summary in the package. In this case the merchant 120 computes the hash on the wrong product. The UE 110 notices that the preview does not match with that of the product requested and notifies the SVPOS$_b$ 100b and merchant 120. Since the mistake was unintentional, the merchant 120 remedies the situation by resending the correct product.

Typically, in this case, the UE 110 would notice the incorrect preview or summary at step 250 when the UE 110 opens the package with the Ks-UE. As described above, the UE 110 sees only the preview or summary but not the product. The UE 110 can notify the SVPOS$_b$ 100b and merchant 120 at this point, or wait until step 275.

In the second scenario, the merchant 120 intentionally (or by mistake) inserts the wrong product in the package. However, the preview or summary inserted into the package is correct, i.e., the preview or summary of the product requested by the UE 110.

In this case, the merchant 120 will calculate a hash$_d$ of the package consisting of (wrong product, the right preview or summary+either a correct or incorrect product identification). At step 250, the UE 110 will see the correct preview or summary and will ask the SVPOS$_b$ 100b for Ks-MER. The hash$_d$ returned by the UE 110 will match the hash$_d$ sent by merchant 120. When SVPOS 100 computes hash$_d$ of the package returned by the UE 110, it matches with the original hash$_d$. Thus, the SVPOS 100 (either SVPOS$_b$ 100b or SVPOS$_m$ 100m) has to resolve the dispute by verifying if product identification matches that of the correct product or the product that the UE 110 wishes to purchase. If the merchant 120 inserts the wrong product by mistake and also inserts the wrong product identification, the SVPOS 100 compares the product identification received from the UE 110 with the correct product identification of the intended product (from its internal database or from an independent agency). The mismatch reveals that the UE 110 was right in disputing the transaction, returning the package, and the SVPOS 100 takes the necessary steps to resolve the dispute.

If the merchant 120 inserted the wrong product and inserted the correct product identification, the merchant 120 will calculate the hash$_d$ of the package consisting of (wrong product, the right preview or summary+the correct product identification). At step 250, the UE 110 will see the correct preview or summary and will ask the SVPOS$_b$ 100b for Ks-MER. This is a case the merchant 120 maliciously tried to pass the wrong content by inserting the correct preview or summary and product identification to confuse the UE 110 and SVPOS 100. A comparison of the hash files from both the UE 110 and merchant 120 will match. Additionally, a comparison of the product identifications by SVPOS 100 will also yield a match. The SVPOS 100 attempt to verify (through an independent agency, e.g., MPA) that the hash of the received product results in the product identification inserted by the merchant. This test will result in a mismatch of product identifications indicating that the merchant has attempted to commit fraud.

In the third scenario, the UE 100 gets the correct product, but attempts to claim that the wrong product was inserted by sending the package back to the SVPOS$_b$ 110b. The UE 110 claims that he/she got a wrong product, even though the preview or summary it received was that of the product requested. When there is a dispute, the UE 110 sends the complete package to SVPOS 100 for dispute resolution. The UE 110 claims that the preview or summary obtained matched that of the product requested, but the merchant 120 inserted a wrong product fraudulently. When the UE 110 returns the package to the SVPOS 100, he/she intentionally inserts a wrong product identification or wrong product (encrypted by Ks-MER∥UE-TMSI) in an effort to prove that the merchant 120 deliberately inserted the wrong product. SVPOS computes hash$_d$=hash$_{mer}$ (Ks-MER∥UE-TMSI {Product+receipt+Product-ID}) of the package sent back by the UE 110. However, since the copy of hash$_d$ received from the merchant 120 was calculated using the actual (correct Product or Product-ID), the new hash$_d$ calculation does not match with the hash$_d$ originally returned by UE 110 to the SVPOS 100 (to confirm the receipt of package and get Ks-MER). This clearly shows that UE 110 has maliciously disputed the reception of the correct content by deliberately inserting a different product or product identification in the return package.

Movie Purchase Case

A subscriber turns her laptop on and logs in to her Verizon account, "ladyship@verizon.com", through the device's UMTS interface using a smart card such as the 3G subscriber Identity Module (SIM). She surfs the web into the Sony Pictures Entertainment site looking to download the movie, "On the Riverfront", onto her laptop. She can access Verizon because she has established a trust relationship with Verizon through a service subscription that allows her to have access to the 3G network via her laptop and activate the laptop in the network. In order to have access to the 3G network the UE 110 will have to attach and activate the UE 110 to the 3G network. Attachment and Activation is references as 900 in FIG. 9. Attachment is the process of introducing the UE 110 to the 3G network, i.e., authenticating the device. Activation is the process of granting a UE 110 the right & means of sending information across the network. For activation and attachment, the UE 110 will send an Attach Request message to the SGSN 126 that includes either its IMSI (International Mobile Subscriber Identity) or its TIMSI (Temporary IMSI) but not both. The SGSN 126 sends an Authentication Request Message containing the UE IMSI (or TIMSI) to the HSS 135 HSS 135 send an Authentication Response message back to the SGSN 126 that contains a random number (RAND), an authentication token (AUTN), a Cipher Key (CK), and the expected response (XRES) among other things. The SGSN 126 uses the information to challenge the UE 100 before sending it the attach response. If the challenge is successful, the SGSN 126 will send an Authentication Request containing the RAND and AUTN back to the UE 110. The UE 110 responds with Authentication Response containing its response. The SGSN 126 sends either a positive or negative Attach Response message back to the UE 110 depending on whether the UE's response matches XRES or not. The UE 110 sends an Activate Packet Data Protocol (PDP) Context Request containing among other things, PDP Address, Network-layer Service Access Point Identifier (NSAPI), PDP Type, Access Point Name (APN), PDP Configuration Options. The SGSN 126 uses the APN received from the UE 110, and the configuration information stored in the SGSN 126 to select a GGSN 127 to be the mobile's serving GGSN 127 and sends a Create PDP Context Request to it. The Create PDP Context Request message contains the NSPAI, PDP Type, PDP Address, APN, QoS negotiated, Tunnel End Point identifier [TEID], Selection Mode, Charging Characteristics, and PDP Configuration Options, etc. After taking necessary actions, the GGSN 127 sends a Create PDP Context Response message back to the SGSN 126. SGSN 126 then negotiates with the RNC 125 and GGSN 127 to establish a Radio Access Bearer before sending a response to the UE 110. The SGSN then sends an Activate PDP Context Response back to the UE 110 confirming the activation of the requested PDP.

Figure 5:
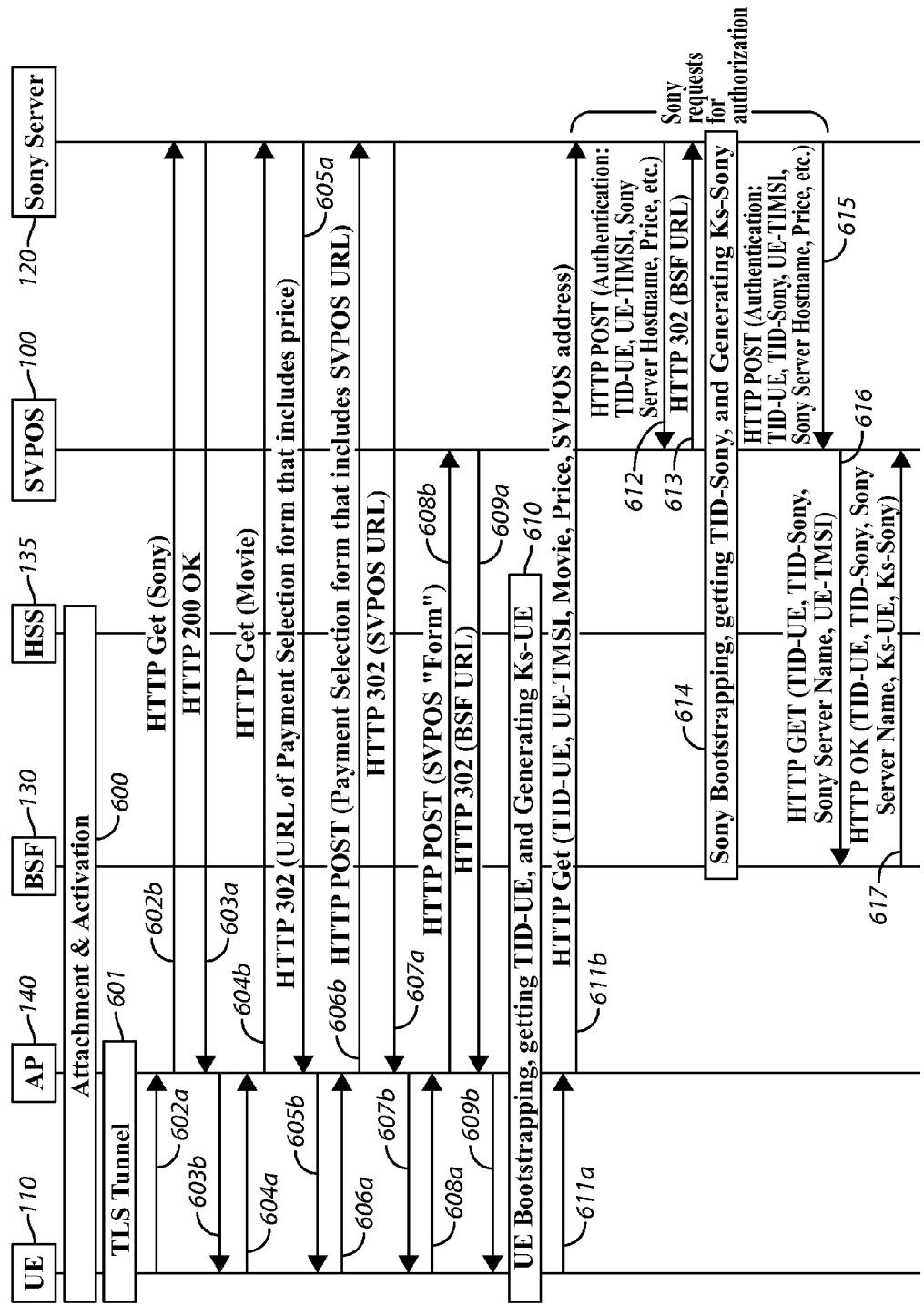
FIGS. 5-6 illustrate a message flow for the electronic payment for a movie in accordance with an embodiment of the invention.
Figure 6:
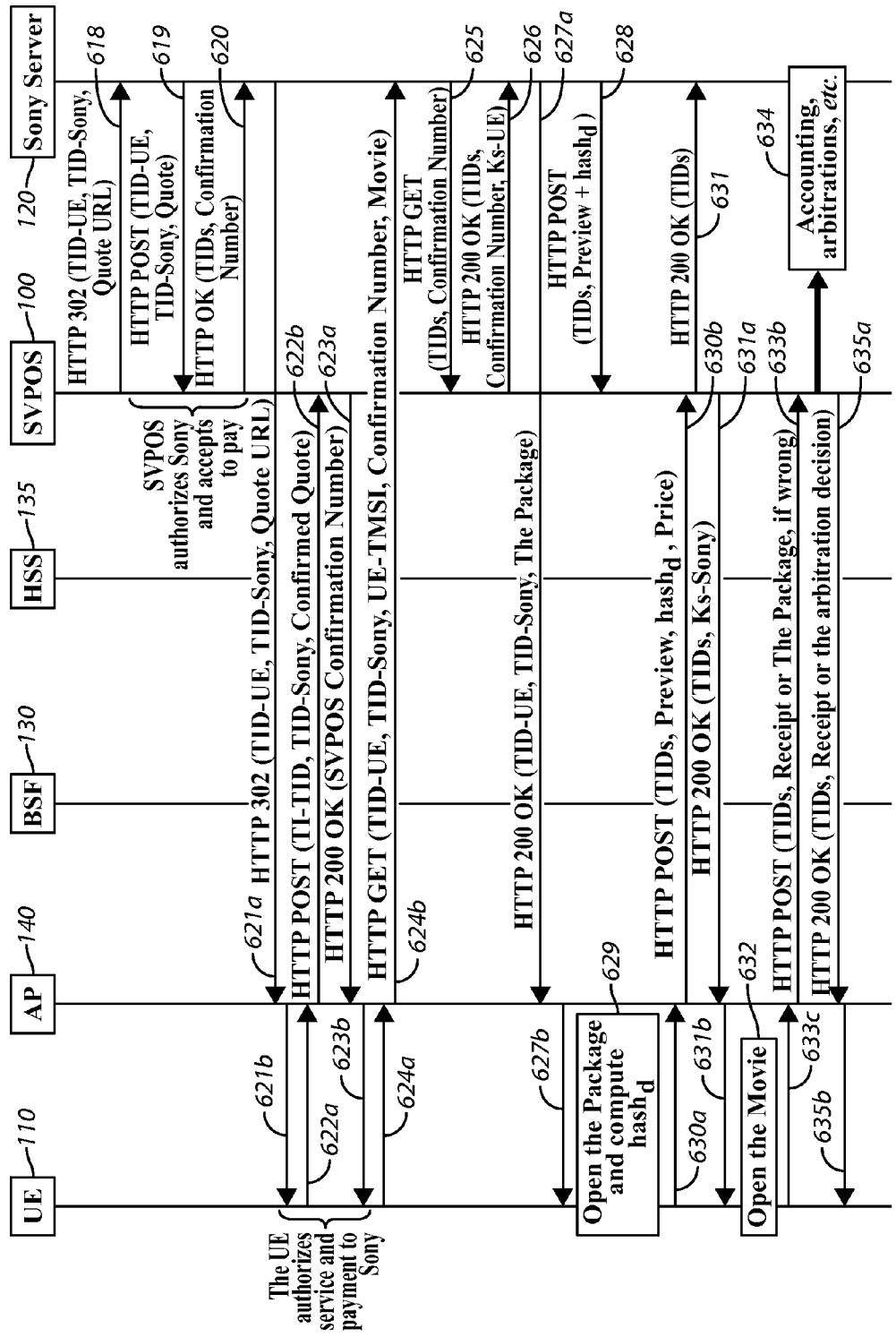

In the example, the Sony server is either connected to the Internet via Sony's subscription to a network operator or is located on a public web server. FIGS. 5 and 6 illustrate a message flow for SVPOS operation for the purchase of a move purchase using an http protocol system. For the purposes of the example, the SVPOS is described as one entity, i.e., the buyers SVPOS and the Sony's SVPOS is the same. As depicted in FIG. 5, the UE 110 does not communicate directly with the SVPOS 100 or Sony Server 120. The UE 110 communicates through an intermediary, the AP 140. The AP 140 allows the UE 110 to remain anonymous. Therefore, any signal generated by or going to the UE 110 is intercepted and relayed by the AP 140. For description purposes, the original signal is referred to as "xxxa" where "xxx" is the signal and the relayed signal is "xxxb". Additionally, the "Sony server" will be referenced as the merchant 120 or Sony 120.

SVPOS 100 utilizes the 3GPP GAA to authenticate subscribers and keep their identities anonymous upon request. The subscriber authentication process is invoked after the subscriber's UE 110 requests for a movie from the merchant 120, sending the SVPOS 100 address informing the merchant 120 that the 3G-operator will pay for the transaction. The UE 110 establishes a TLS tunnel 601 to the AP 140 sending all his packets to it for forwarding to the application servers. The strength of AP 140 is that it can serve as a privacy policy enforcement point for the 3G operator, where it can enforce different privacy/anonymity policies for different services.

The UE 110 opens the Sony page, i.e., it sends an HTTP GET (602*a* and 602*b*) http://www.sony.com message to Sony 120. The Sony 120 responds with a 200 OK (603*a*) message to display the page on the screen of the UE 110. The message is relayed by the AP 140 as 603*b*. The user clicks on the link to the movie, On the Waterfront, i.e., the UE 110 sends a GET movie (604*a* and 604*b*) (http://www.sony.com/onthewaterfront.html) to Sony 120. Sony 120 responds to the user with an HTTP 302 message (605*a* and 605*b*) redirecting the user to the payment selection form that includes the price. The HTTP 302 message contains the URL of the payment selection form on Sony 120 which also shows the price. The user fills out the payment FORM by including the URL of the SVPOS 100 in the field informing that the operator, i.e., Verizon pays; and clicks on the button to submit, i.e., the UE 110 sends a POST (606*a* and 606*b*) http://www.sony.com/onthewaterfront.html/form to the Sony 120. Sony 120 sends a HTTP 302 (607*a* and 607*b*) (SVPOS URL) message redirecting the UE 110 to SVPOS 100 to ensure that the user is a SVPOS subscriber, and the operator will pay Sony 120. The UE 110 fills out the SVPOS form and submit it to the SVPOS 100, i.e., sends a HTTP POST (608*a* and 608*b*) http://www.verizon.com/svpos/form to the SVPOS 100. SVPOS 100 sends back a HTTP 302 (609*a* and 609*b*) message redirecting the UE 110 to the BSF 130 and instructing it to use bootstrapping with GAA to authenticate its identity.

Figure 7:
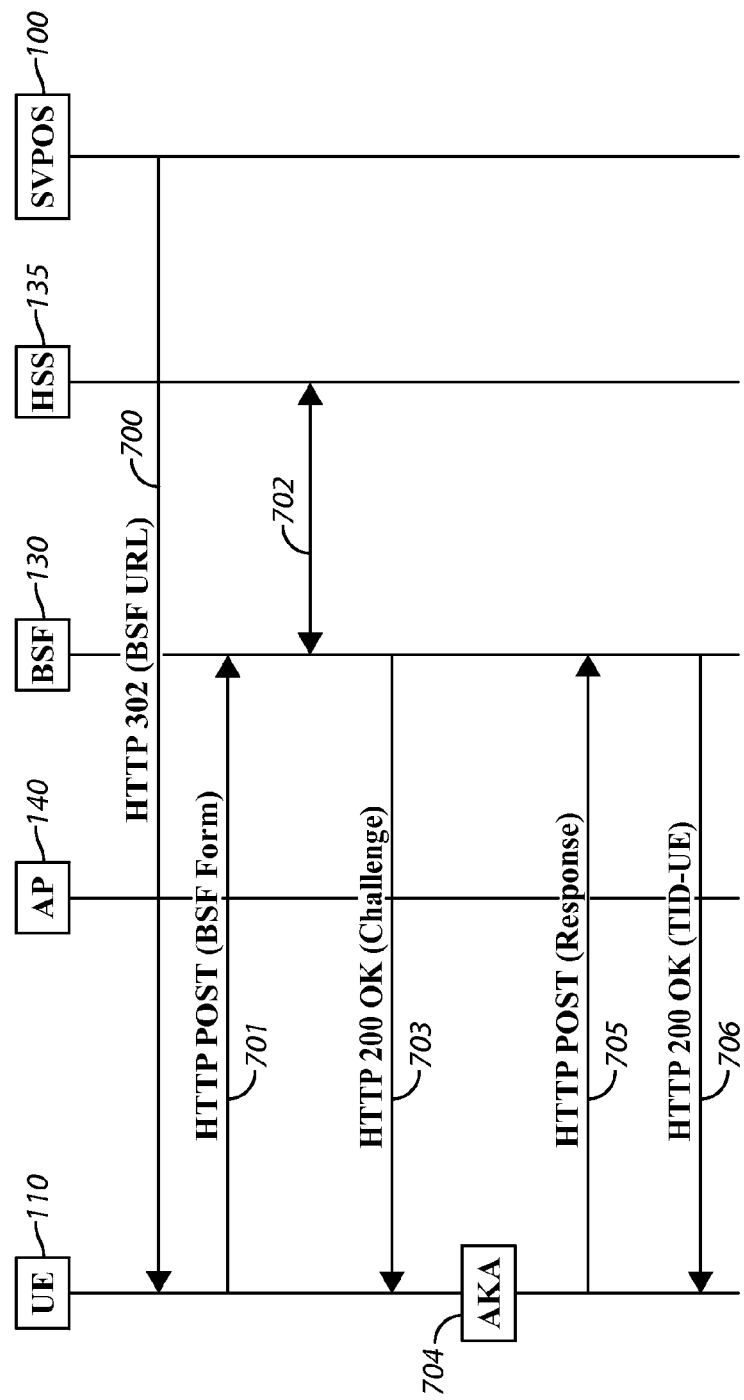
FIG. 7 illustrates a message flow for the authentication of a UE device for the payment for a movie in accordance with an embodiment of the invention.

The authentication and bootstrapping message flow is illustrated in FIG. 7. The SVPOS 100 sends a message 700 with the BSF 130 URL to the UE 110. The UE 110 requests for a transaction identifier (TID-UE) by sending a HTTP POST http://www.verizon.com/BSF/form message 701 to the BSF 130. The BSF 130 gets UE's authentication vector 702 from the HSS 135. BSF 130 sends a HTTP 200 OK message 703 to the UE 110 challenging the UE 110 to authenticate its identity. The UE 110 uses this challenge with the AKA 704 in its SIM card to generate a key, Ks-UE. UE 110 sends an HTTP POST 705 containing the appropriate response to the BSF 130 challenge. The BSF 130 sends a HTTP 200 OK 706 containing a transaction identifier, (TID-UE) to the UE 110.

Upon the reception of the TID-UE, the UE 110 renews its request for the movie to Sony 120 sending a HTTP GET (611*a* and 611*b*) to Sony 120 containing the TID-UE, UE-TMSI, the movie, the price, and SVPOS address, e.g., HTTP GET http://www.sony.com?ID=TIDUE&UE=TMSI&movie=xxx&SVPOS=yyy.

Figure 8:
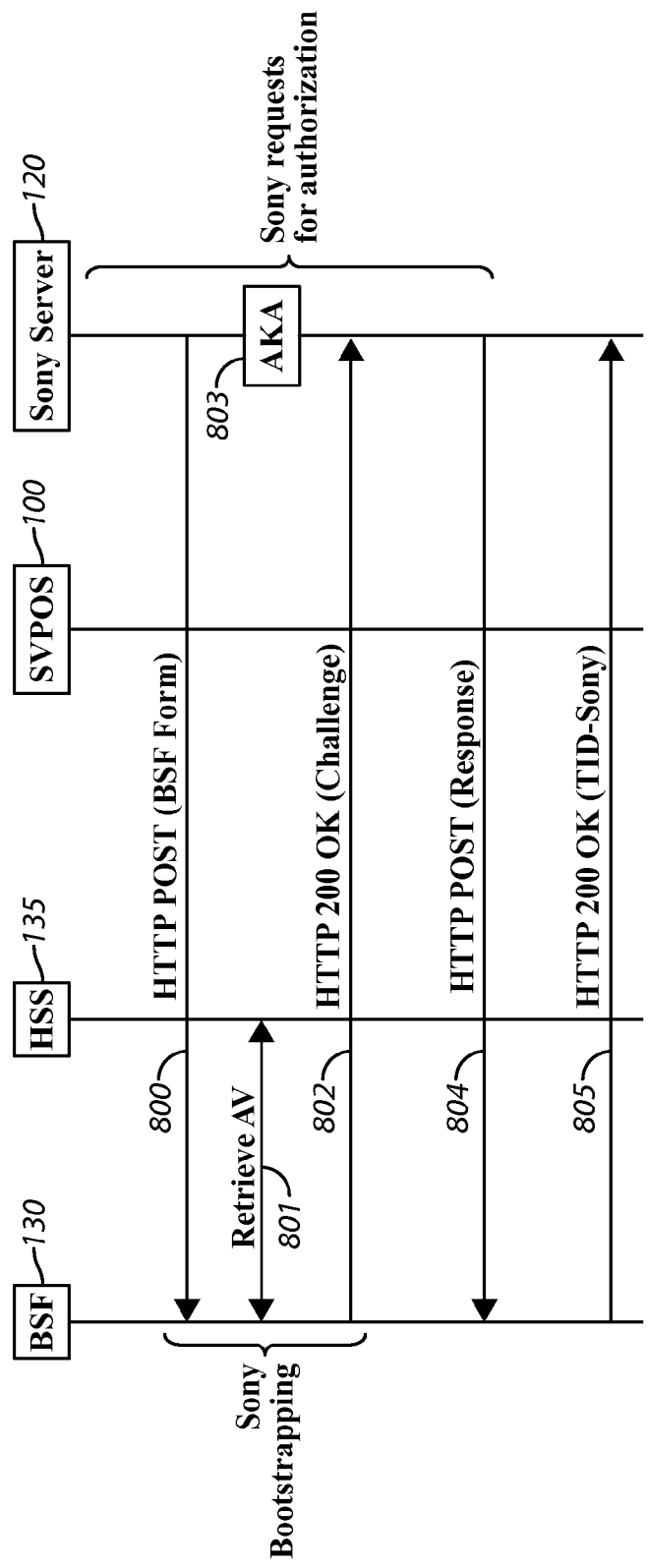
FIG. 8 illustrates a message flow for the authentication of Sony for the payment for a movie in accordance with an embodiment of the invention.

After reception of the renewed request with appropriate parameters (i.e., TID-UE, UE-TMSI, etc.) from the UE 110 for the movie, the merchant (i.e., Sony 120) sends a HTTP Post message containing TID-UE, UE, TMSI, Price, etc., 612 to the SVPOS 100 requesting for authorization of the transaction. SVPOS 100 sends a response 613 to the Sony 120 instructing it to bootstrap 614. FIG. 8 illustrates the message flow for the bootstrapping for the Sony 120. Then the merchant bootstraps as follows to get its transaction identifier (TID-Sony), and generate its key (Ks-Sony).

Sony 120 requests for a transaction identifier (TID-UE) by sending a HTTP POST http://www.verizon.com/BSF/form message 800 to the BSF 130. The BSF 130 gets Sony's authentication vector 801 from the HSS 135. BSF 130 sends a HTTP 200 OK message 802 to the Sony 120 challenging the Sony 120 to authenticate its identity. Sony 120 uses this challenge with the AKA 803 in its SIM card, or equivalent to generate a key, Ks-Sony. Sony 120 sends an HTTP POST 804 containing the appropriate response to the BSF challenge. The BSF 130 sends a HTTP 200 OK 805 containing a transaction identifier, (TID-UE) to the Sony 120.

Upon obtaining TID-Sony, and Ks-Sony, Sony 120 renews its request for authorization from the SVPOS 100, sending it a request HTTP POST 615 to SVPOS 100 containing TID-UE, TID-Sony, Sony server hostname, Price, etc. The SVPOS 100 sends a message HTTP GET 616 to BSF 130 containing TID-UE, TID-Sony, UE-TMSI, etc requesting for Ks-UE, and Ks-Sony for the transaction. The BSF 130 sends a message HTTP OK 617 containing the TIDs, Ks-UE, Ks-Sony, "UE address", Sony server hostname, etc.

The SVPOS 100 sends a message HTTP 302 (618) to Sony 120 asking it to re-confirm the transaction. This message will be a HTTP 302 (618) redirect message containing TIDs, and the URL of the transaction quote on the SVPOS 100. Sony 120 reviews the quote, and sends a HTTP Post (619) containing the TIDs, as well as the reviewed transaction quote to the SVPOS 100. Sony 120 reconfirms the transaction with a message HTTP POST (619).

Upon reception of reconfirmation from Sony 120, the SVPOS 100 sends a response message HTTP OK 620 to the Sony 120 containing the TIDs, and confirmation number of the transaction. Sony 120 sends a message HTTP 302 (621*a* and 621*b*) asking it to reconfirm the transaction. Sony 120 sends a HTTP 302 message (621*a* and 621*b*) to the UE 110 containing the URL of the transaction quote on the SVPOS 100 for its confirmation. The message HTTP 302 (621*a* and 621*b*) will include the TIDs and the URL quote. UE 110 sends a HTTP POST message (622*a* and 622*b*) containing the TIDs, and the confirmed transaction quote to the SVPOS 100. This will be the UE's confirmation of the transaction. The SVPOS 100 responds to the UE 110 with a HTTP 200 OK (623*a* and 623*b*) containing the TIDs, and the transaction confirmation number. The UE 110 effectively authorized payment by the SVPOS 100 for the goods and service.

The UE 110 renews its request for the movie by sending an HTTP GET (624*a* and 624*b*) containing the TIDs, transaction confirmation number, and the Movie to the Sony 120. Sony 120 sends an HTTP GET (625) to SVPOS 100 containing the TIDs and the transaction confirmation address asking for the Ks-UE. The SVPOS 100 sends a 200 OK response message (626) to Sony 120 containing the TIDs, the transaction confirmation number, and the Ks-UE. Sony sends a HTTP 200 OK response message (627a and 627b) to the UE 110 containing a package that includes the TIDs, the requested movie, as well as other things. Since the movie is electronically deliverable, the package includes the product. The package will contain the movie, the receipt, and the Movie-ID. The package will be encrypted by Ks-Sony||UE-TMSI. The package will also include the movie preview. The Preview is a synopsis of the movie for the user to check whether the received movie is what she/he asked for. The package looks as follows:
Package=Ks-UE{Preview+Ks-Sony||UE-TMSI {Movie+receipt+Movie-ID}. In another embodiment, the package will include a non-repudiation key.

Sony 120 then sends the preview and $hash_d$ (628) to the SVPOS 100. The message is in the form of a HTTP POST. The hash is calculated by Sony 120. The UE 110 opens the package (629). The UE 100 decrypts the package using Ks-UE, derives (Preview+Ks-Sony||UE-TMSI {Movie+receipt+Movie-ID} and computes $hash_d$. (629). The UE 110 sends its computed $hash_d$ to the SVPOS 100. The computed hash is sent as part of a HTTP POST (630a and 630b). The SVPOS 100 compares both hash files (from UE 110 and Sony 120) to determine if the hashes are identical. If it matches, it assures that the UE 110 has correctly received the package (however, it still does not guarantee that the movie is the same that the user requested). If there is a match, the SVPOS 100 send a HTTP OK message to both Sony 120 and the UE 110. The message to Sony HTTP OK 631 only includes TIDs, but the message to the UE 110, HTTP OK (631a and 631b), includes both the TIDs and Ks-Sony. The UE 110 decrypts 632 the movie, the receipt and movie-ID. If the movie is the right one, the UE 100 sends the receipt to the SVPOS 100 (HTTP POST 633a and 633b) and the transaction concludes successfully, otherwise, the UE 110 returns the Package (HTTP POST 633a and 633b) (no receipt) to the SVPOS 100 and waits for the decision of the SVPOS 100 regarding the transaction.

If the transaction is successful, the SVPOS 100 releases payment to Sony 120. The SVPOS 100 will send a HTTP OK (635a and 635b) to the UE 110. The message will include the receipt. If there is a dispute, i.e., UE 110 returned the package; the SVPOS 100 will perform arbitration. The SVPOS 100 will send a HTTP OK (635a and 635b) to the UE 110. This message will include the results of the arbitration.

Figure 9:
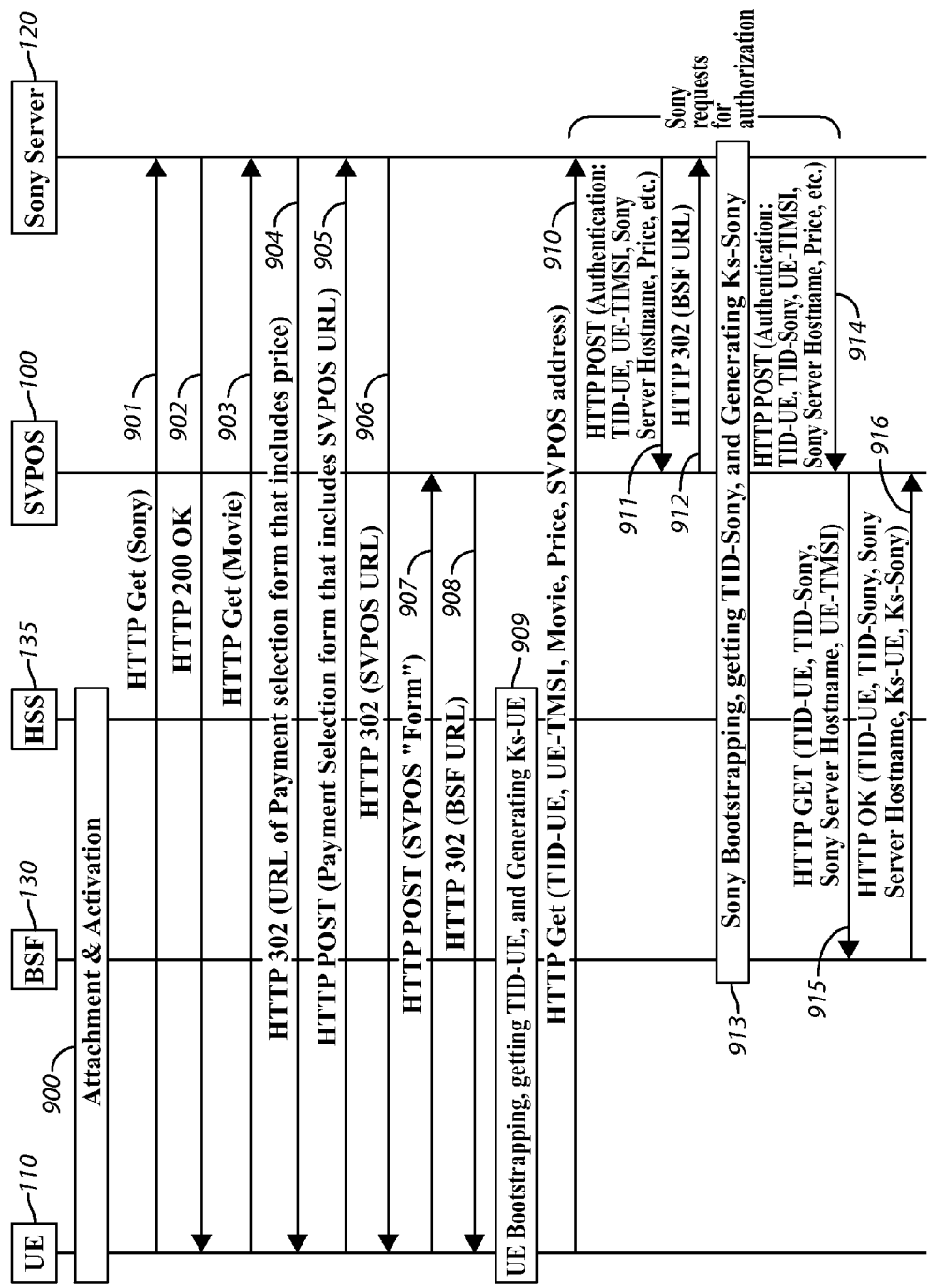
FIGS. 9-10 illustrate the message flow for the payment of a movie purchase according to an alternate embodiment of the invention.
Figure 10:
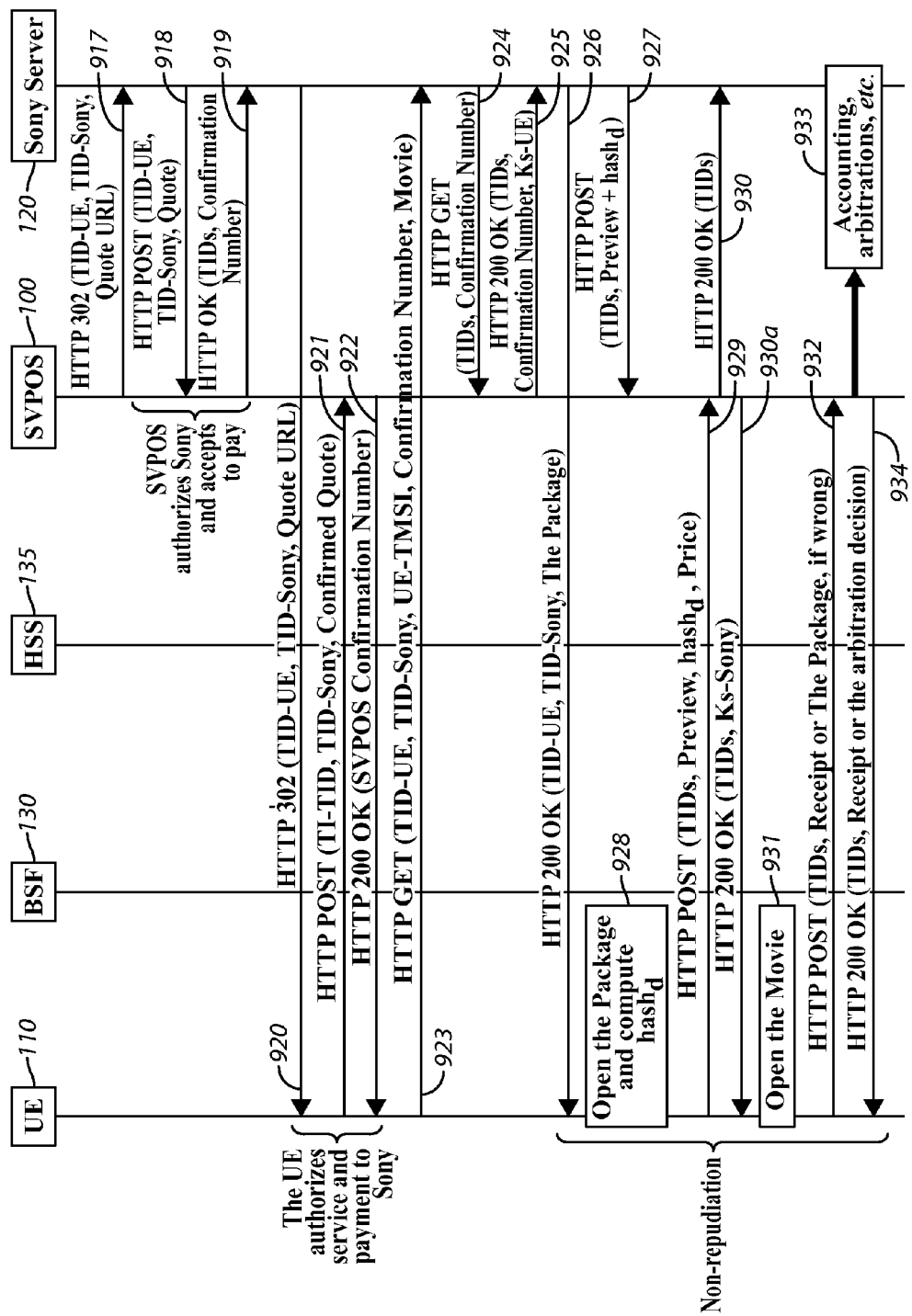

FIGS. 9 and 10 illustrate the message flow for the movie purchase example according to an embodiment of the invention. In the alternate embodiment, the UE 110 communicates without using the AP 140 as an intermediary. Since the AP 140 is removed, the messages are not relayed. The message flow or order of the messages is identical to the messages in FIGS. 5 and 6, i.e. 600-635. These messages are labels 900-934. The difference between FIGS. 5 and 6, and FIGS. 9 and 10 is that the TLS tunnel is not needed in FIGS. 9 and 10. Accordingly, the description of each message will not be repeated.

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method of performing an electronic commercial transaction for at least one of a product or service between a merchant system and a electronic device, the method comprising:
receiving, at a secure virtual point of service server device, a buyer encryption key from the electronic device;
receiving, at the server device, a merchant encryption key and a merchant hash from the merchant system of at least a portion of a package for the commercial transaction encrypted with the merchant encryption key;
facilitating non-repudiation of the package by sending, with the server device, the buyer encryption key to the merchant system to encrypt the package with both the merchant encryption key and the buyer encryption key to create an encrypted package prior to the merchant system sending the package to the electronic device;
receiving, at the server device, a buyer hash from the electronic device of at least an identical portion of the package encrypted with the merchant encryption key as that of the merchant hash after the electronic device has partially decrypted the encrypted package with the buyer encryption key;
comparing, with the server device, the buyer hash and the merchant hash;
transmitting, with the server device and based upon the comparison, the merchant encryption key to the electronic device to fully decrypt the encrypted package and determine whether the encrypted package includes the at least one of a product or service; and
receiving, at the server device, authorization for payment for the commercial transaction based upon the determination.

2. The method of claim 1 further comprising:
receiving, at the server device, authentication from the electronic device and the merchant system.

3. The method of claim 1 wherein facilitating non-repudiation of the package by sending the buyer encryption key to the merchant system comprises:
receiving, at the server device, authorization from the electronic device; and
transmitting, with the server device, the buyer encryption key to the merchant system upon receipt of the authorization.

4. The method of claim 2, wherein receiving authentication from the electronic device further comprises:
directing, with the server device, the electronic device to a bootstrapping server device;
receiving, at the bootstrapping server device, a request for first transaction identification from the electronic device;
obtaining, with the bootstrapping server device, authentication vectors for the electronic device from a home subscriber server device;
issuing, with the bootstrapping server device, a challenge to the electronic device;
receiving, at the bootstrapping server device, a response including at least the buyer encryption key to the challenge; and
transmitting, with the bootstrapping server device, the first transaction identification to the electronic device and the server device.

5. The method of claim 1, wherein receiving the buyer encryption key from the electronic device and the merchant encryption key from the merchant system comprises receiving, at the server device, a buyer encryption key generated in a subscriber identity module card in the electronic device from the electronic device and a merchant encryption key generated in a subscriber identity module card located at the merchant system from the merchant system, wherein the buyer and merchant encryption keys are different for each transaction.

6. The method of claim 1, wherein receiving the merchant hash from the merchant system of the at least a portion of the package further comprises receiving, at the server device, a merchant hash from the merchant system of at least a portion of a package including the at least one of a product or service from the commercial transaction, a product-ID, or a receipt.

7. The method of claim 6, further comprising:
receiving, at the server device, the package from the electronic device for arbitration in response to the package not including the at least one of a product or service.

8. The method of claim 6, further comprising:
receiving, at the server device, the receipt from the electronic device; and
releasing payment in response to the package including the at least one of a product or service.

9. The method of claim 7, wherein the arbitration further comprises:
determining, with the server device, whether the product-ID comprises a correct product-ID for the at least one of a product or service purchased via the electronic device, wherein the correct product-ID is determined based upon a comparison of product-IDs stored in a database with the received product-ID;
determining, with the server device, whether a product identified by the correct product-ID was received by the electronic device; and
comparing, with the server device, the received product-ID with the received product.

10. The method of claim 1, wherein receiving the merchant hash comprises receiving, at the server device, a keyed merchant hash encrypted using a key obtained through a public key infrastructure.

11. The method according to claim 1, wherein receiving the buyer encryption key from the electronic device comprises receiving, at the server device, the buyer encryption key from a mobile telephone.

12. The method according to claim 1, wherein receiving the buyer encryption key from the electronic device comprises receiving, at the server device, the buyer encryption key from a portable computer.

13. The method of claim 2, wherein receiving authentication from the merchant system further comprises:
directing, with the server device, the merchant system to a bootstrapping server device;
receiving, at the bootstrapping server device, a request for first transaction identification from the merchant system;
obtaining, with the bootstrapping server device, authentication vectors for the merchant system from a home subscriber server device;
issuing, with the bootstrapping server device, a challenge to the merchant system;
receiving, at the bootstrapping server device, a response including at least the merchant encryption key to the challenge; and
transmitting, with the bootstrapping server device, the first transaction identification to the merchant system and the server device.

14. A non-transitory computer readable medium having instructions for performing an electronic commercial transaction for at least one of a product or service between a merchant system and a electronic device stored thereon that, in response to execution by a device, cause the device to perform operations comprising the steps of:
receiving a buyer encryption key from the electronic device;
receiving a merchant encryption key and a merchant hash from the merchant system of at least a portion of a package for the commercial transaction encrypted with the merchant encryption key;
facilitating non-repudiation of the package by sending the buyer encryption key to the merchant system to encrypt the package with both the merchant encryption key and the buyer encryption key to create an encrypted package prior to the merchant system sending the package to the electronic device;
receiving a buyer hash from the electronic device of at least an identical portion of the package encrypted with the merchant key as that of the merchant hash after the electronic device has partially decrypted the encrypted package with the buyer encryption key;
comparing the buyer hash and the merchant hash;
transmitting, based upon the comparison, the merchant encryption key to the electronic device to fully decrypt the encrypted package and determine whether the encrypted package includes the at least one of a product or service; and
receiving authorization for payment for the commercial transaction based upon the determination.

15. The non-transitory computer readable medium of claim 14, the operations further comprising: receiving authentication from the electronic device and the merchant system.

16. The non-transitory computer readable medium of claim 14, wherein facilitating non-repudiation of the package by sending the buyer encryption key to the merchant system comprises:
receiving authorization from the electronic device; and
transmitting the buyer encryption key to the merchant system upon receipt of the authorization.

17. The non-transitory computer readable medium of claim 14, wherein receiving the buyer encryption key comprises receiving a buyer encryption key generated based upon unique identification information in a subscriber identity module card in the electronic device, and wherein receiving the merchant encryption key comprises receiving a merchant encryption key generated based upon unique identification information in a subscriber identity module card located at the merchant, wherein the buyer and merchant encryption keys are different for each transaction.

18. The non-transitory computer readable medium of claim 15, wherein receiving the merchant hash from the merchant system of the at least a portion of the package comprises receiving a merchant hash from the merchant system of at least a portion of a package including the at least one of a product or service from the commercial transaction, a product-ID, or a receipt.

19. The non-transitory computer readable medium of claim 18, the operations further comprising:
receiving the encrypted package from the electronic device for arbitration in response to a determination that the package does not include the at least one of a product or service.

20. The non-transitory computer readable medium of claim 18, the operations further comprising:
receiving the receipt from the electronic device and releasing payment in response to a determination that the package includes the at least one of a product or service.

21. The non-transitory computer readable medium of claim 19, further comprising performing the arbitration, wherein the arbitration comprises:
- determining whether the product-ID comprises a correct product-ID for the at least one of a product or service purchased via the electronic device, wherein the correct product-ID is determined based upon a comparison of product-IDs stored in a database with the received product-ID;
- determining whether a product identified by the correct product-ID was received by the electronic device; and
- comparing the received product-ID with the received product.

22. The non-transitory computer readable medium of claim 14, wherein receiving the merchant hash comprises receiving a keyed merchant hash encrypted using a key obtained through a public key infrastructure.

* * * * *